(12) United States Patent
Contreras

(10) Patent No.: US 11,983,831 B1
(45) Date of Patent: May 14, 2024

(54) SYSTEMS AND METHODS FOR COLLABORATIVE LOCATION TRACKING AND SHARING USING AUGMENTED REALITY

(71) Applicant: ON LLC, Corona, CA (US)

(72) Inventor: Luis Contreras, Corona, CA (US)

(73) Assignee: ON LLC, Corona, CA (US)

( * ) Notice: Subject to any disclaimer, the term of this patent is extended or adjusted under 35 U.S.C. 154(b) by 0 days.

(21) Appl. No.: 18/348,456

(22) Filed: Jul. 7, 2023

Related U.S. Application Data

(63) Continuation of application No. 18/047,756, filed on Oct. 19, 2022, now Pat. No. 11,710,285.

(51) Int. Cl.
| | | |
|---|---|---|
| *G06T 19/00* | (2011.01) | |
| *G01C 21/34* | (2006.01) | |
| *G01S 7/4865* | (2020.01) | |
| *G06T 19/20* | (2011.01) | |
| *G06V 40/10* | (2022.01) | |

(52) U.S. Cl.
CPC ........ *G06T 19/006* (2013.01); *G01C 21/3407* (2013.01); *G01S 7/4865* (2013.01); *G06T 19/20* (2013.01); *G06V 40/103* (2022.01); *G06T 2219/2004* (2013.01)

(58) Field of Classification Search
None
See application file for complete search history.

(56) References Cited

U.S. PATENT DOCUMENTS

| | | |
|---|---|---|
| 9,924,315 B1 | 3/2018 | Cornwall et al. |
| 10,757,672 B1 | 8/2020 | Knas et al. |
| 11,363,407 B2 | 6/2022 | Contreras |
| 2012/0157157 A1 | 6/2012 | Chakra et al. |
| 2013/0297690 A1 | 11/2013 | Lucero et al. |

OTHER PUBLICATIONS

Reina et al. ARK:Augmented Reality for Kilobots, Dec. 2017 IEEE 1755-1761 (Year: 2017).

*Primary Examiner* — Robert J Craddock
(74) *Attorney, Agent, or Firm* — Ansari Katiraei LLP; Arman Katiraei; Sadiq Ansari

(57) ABSTRACT

Disclosed is a location tracking system and associated methods for precisely locating a target device with a recipient device via different forms of location tracking and augmented reality. The recipient device receives a first position of the target device over a data network. The recipient device is moved according to the first position until the target device is in Ultra-WideBand ("UWB") signaling range of the recipient device. The recipient device then measures a distance and direction of the target device relative to the recipient device based on Time-of-Flight ("ToF") measurements generated from the UWB signaling. The recipient device determines a second position of the target device based on the distance and direction of the target device, and generates an augmented reality view with a visual reference at a particular position in images of a captured scene that corresponds to the second position of the target device.

20 Claims, 9 Drawing Sheets

SYSTEMS AND METHODS FOR COLLABORATIVE LOCATION TRACKING AND SHARING USING AUGMENTED REALITY

CLAIM OF BENEFIT TO RELATED APPLICATIONS

This application is a continuation of U.S. nonprovisional application Ser. No. 18/047,756 entitled "Systems and Methods for Collaborative Location Tracking and Sharing Using Augmented Reality", filed Oct. 19, 2022. The contents of application Ser. No. 18/047,756 are hereby incorporated by reference.

BACKGROUND

Mobile devices have made it easier for a person to share their location with others. The person places a "pin" on a digital map using their target device, and share the pinned location with one or more desired contacts. The pinned location is transmitted to a recipient mobile device of a desired contact. Navigational sensors and/or navigational services of the recipient mobile device guide the desired contact to the pinned location on the map. The recipient mobile device does not, however, assist in locating the target device or the person sharing their location once at the pinned location. For instance, the pinned location may be a crowded building, and the person sending the pinned location may be interspersed amongst hundreds of other people in the crowded building, thereby making it difficult for anyone to locate that person.

DETAILED DESCRIPTION OF PREFERRED EMBODIMENTS

The following detailed description refers to the accompanying drawings. The same reference numbers in different drawings may identify the same or similar elements.

Provided are systems and methods for collaborative location tracking and sharing using augmented reality. The collaborative location tracking and sharing involves using network geolocation services or onboard positional sensors to identify the approximate location of a target device, sharing the approximate location of the target device with a recipient device, and switching to device-to-device communications to accurately measure the distance and directionality of the target device relative to the recipient device once the recipient device enters into signaling range of the target device by using the shared approximate location of the target device. The collaborative location tracking and sharing further involves generating an augmented reality view based on the distance and directionality measures determined from the device-to-device communications. The augmented reality view provides a precise visual reference that is overlaid on a real-world view of the surrounding environment. The visual reference pinpoints and identifies the exact location of the target device amongst many other devices and/or persons in the real-world view and/or a crowded setting.

The collaborative location tracking and sharing includes the sharing of the location tracking information (e.g., real-time positional information) as well as state information across members of a group, team, region, or other affiliation for the purpose of coordinating the activity of multiple users without having to individually contact each user for their location, state, or coordination instruction. In some embodiments, the collaborative location tracking and sharing involves issuing a status request message to members of a group (e.g., the devices of the group members), receiving state information from the group members, and creating an augmented reality view to present the group member locations with different status indicators based on the state information provided by each group member in response to the status request message. First responders, emergency service providers, group leaders, and/or other teams that perform collaborative tasks are able to coordinate their movements and track a real-time status and location of each team member without team members having to manually provide updates and/or without constant back-and-forth communication between the team members and/or team members and team leaders.

Figure 1:
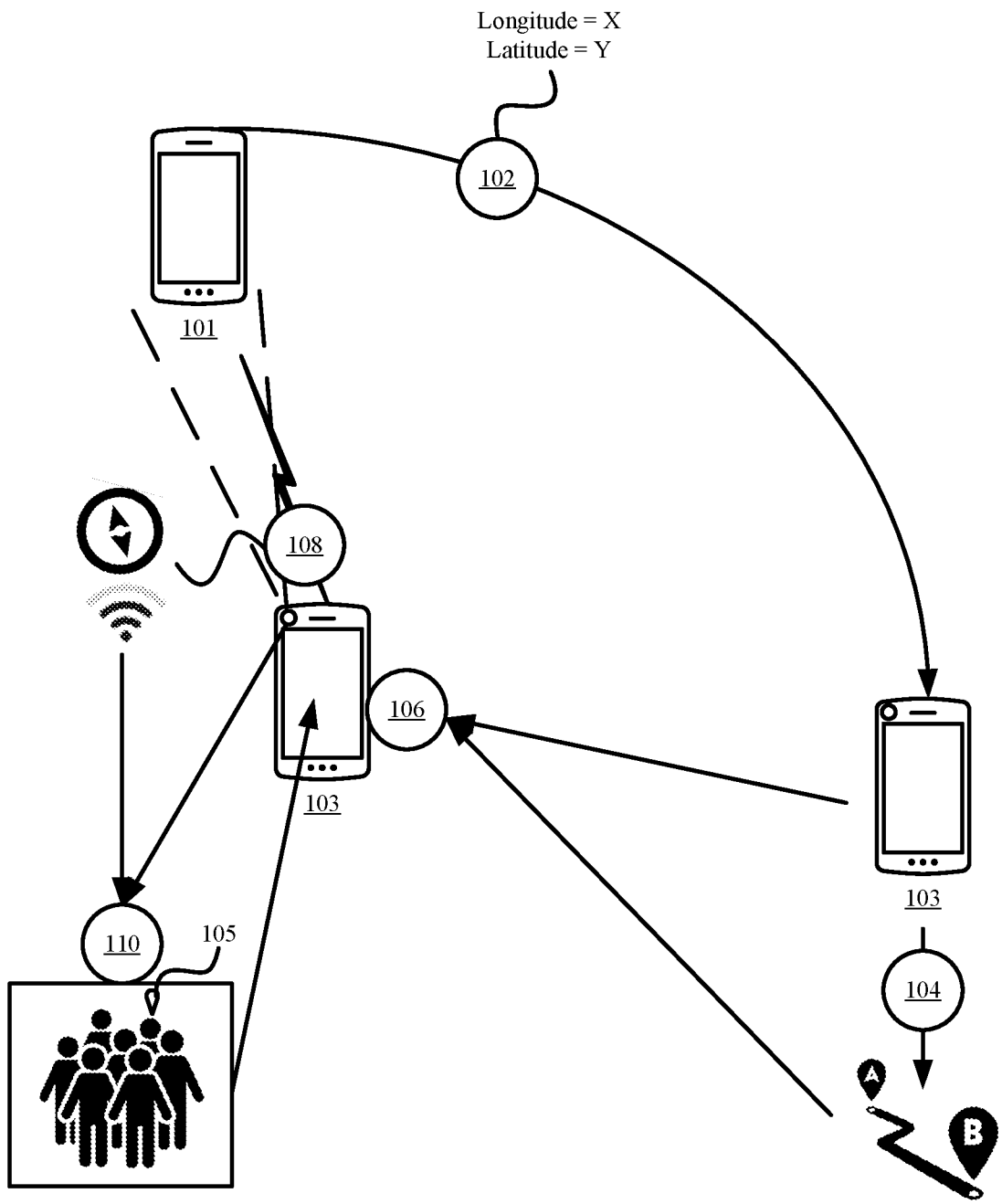
FIG. 1 illustrates example usage of the collaborative location tracking and sharing using augmented reality in accordance with some embodiments presented herein.

FIG. 1 illustrates example usage of the collaborative location tracking and sharing using augmented reality in accordance with some embodiments presented herein. The collaborative location tracking and sharing illustrated in FIG. 1 involves target device 101 and recipient device 103.

Target device 101 and recipient device 103 include mobile devices of different users with geolocation services, wireless radios for network communication and device-to-device communication, cameras or imaging sensors for capturing a real-world view of the surrounding environment, a display for presenting the real-world view and/or augmented reality view based on the images captured by the cameras or imaging sensors, and/or one or more processors, memory, storage, and/or other compute resources for generating the augmented reality view and performing the collaborative location tracking and sharing. Target device 101 and recipient device 103 include smartphones, tablets, wearable devices (e.g., augmented reality glasses or headsets), drones (e.g., remote controlled devices), and the like.

Positioning of each device 101 and 103 is determined using one or more of global positioning system ("GPS") sensors, signal triangulation, positional beacons, and/or other sensors and signaling. These methods of positional tracking are accurate to within several feet or meters, and are therefore inaccurate with respect to singling out one device or one user amongst other devices or users in a crowded setting.

For positional tracking that is accurate to within several centimeters, devices 101 and 103 include one or more of a Bluetooth 5.1 radio, Ultra-WideBand ("UWB") radio, or other radios from which distance and directionality measures may be obtained from device-to-device communications (e.g., signaling that devices 101 and 103 transmit to one another without intermediary relay devices). For instance, Time-of-Flight ("ToF") measurements performed using UWB signaling accurately locate the distance and direction of a device transmitting the UWB signaling. However, the positional tracking conducted via the device-to-device communications is limited by the signaling range of the radios which is in the tens of meters.

Accordingly, the collaborative location tracking and sharing leverages both of the long-range but less accurate location tracking and the short-range but very accurate location tracking to coordinate movements, and allow different users to easily find one another even in crowded settings. To commence the collaborative location tracking and sharing, target device 101 provides (at 102) its location to recipient device 103.

In some embodiments, target device 101 tracks its position via navigational sensors and/or network geolocation services, and provides (at 102) the tracked position to recipient device 103. In some other embodiments, the user of target device 101 opens a mapping application, places a pin to set the pinned location, and transmits the user-defined pinned location to recipient device 103.

Recipient device 103 receives (at 102) the location of target device 101 via the cloud, a wireless data network, or a telecommunications network. Recipient device 103 generates (at 104) instructions to guide its user towards target device 101 based on the received location of target device 101.

When target device 101 is more than a threshold distance away (e.g., 100 meters) from recipient device 103, recipient device 103 generates (at 104) map-based navigational instructions to guide the user of recipient device 103 in moving closer to the position of target device 101.

In some other embodiments, recipient device 103 generates (at 104) a first augmented reality view based on the received location information. Specifically, recipient device 103 accesses its camera or imaging sensor, obtains a real-world view using the camera or imaging sensor, presents the real-world view on a display, accesses its positional and/or orientation sensors (e.g., accelerometers, compass, inertial measurement unit sensors, etc.), and adds a visual identifier within the real-world view that identifies the received location of target device 101 relative to the position and orientation of recipient device 103. At this initial position, target device 101 is not within the real-world view or the field-of-view of recipient device 103. Accordingly, the visual identifier is presented in the general direction of target device 101 and is not associated with any objects presented in the real-world view.

A user moves (at 106) recipient device 103 based on the generated (at 104) instructions. As recipient device 103 nears target device 101, devices 101 and 103 exchange messages directly with one another and/or establish a device-to-device communication session. For instance, target device 101 periodically transmits device-to-device connection or session establishment messages that recipient device 103 receives once in range of target device 101. In some embodiments, devices 101 and 103 exchange Bluetooth messages, establish a Bluetooth connection, exchange UWB messages, and/or establish an UWB session. The messages include a unique identifier of target device 101.

Recipient device 103 is configured to perform (at 108) distance and directional measurements via device-to-device communications upon detecting the unique identifier of target device 101. In some embodiments, recipient device 103 measures the signal strength and directionality of the messages issued by target device 101, and computes the exact distance, direction, and/or position of target device 101 relative to recipient device 103 based on the measurements. In some other embodiments, recipient device 103 performs ToF measurements based on the received signaling from target device 101, and computes the exact distance, direction, and/or position of target device 101 relative to recipient device 103 based on the ToF measurements.

Recipient device 103 generates (at 110) a second augmented reality view based on the distance, direction, and/or position of target device 101, as determined from the device-to-device messaging, relative to the position and orientation of recipient device 103, as determined from the positional and orientation sensors of recipient device 103. Generating (at 110) the second augmented reality view includes overlaying the images, that are captured by the recipient device 103 camera and/or imaging sensor, with visual reference 105 that accurately identifies the position of target device 101 within the presented images.

Recipient device 103 updates the augmented reality view based on changing signal strength, directionality, and/or ToF measurements obtained from the signaling transmitted by target device 101. Specifically, as recipient device 103 gets closer to target device 101, the visual reference gets larger and is moved in the augmented reality view in concert with the moving position of target device 101.

Figure 2:
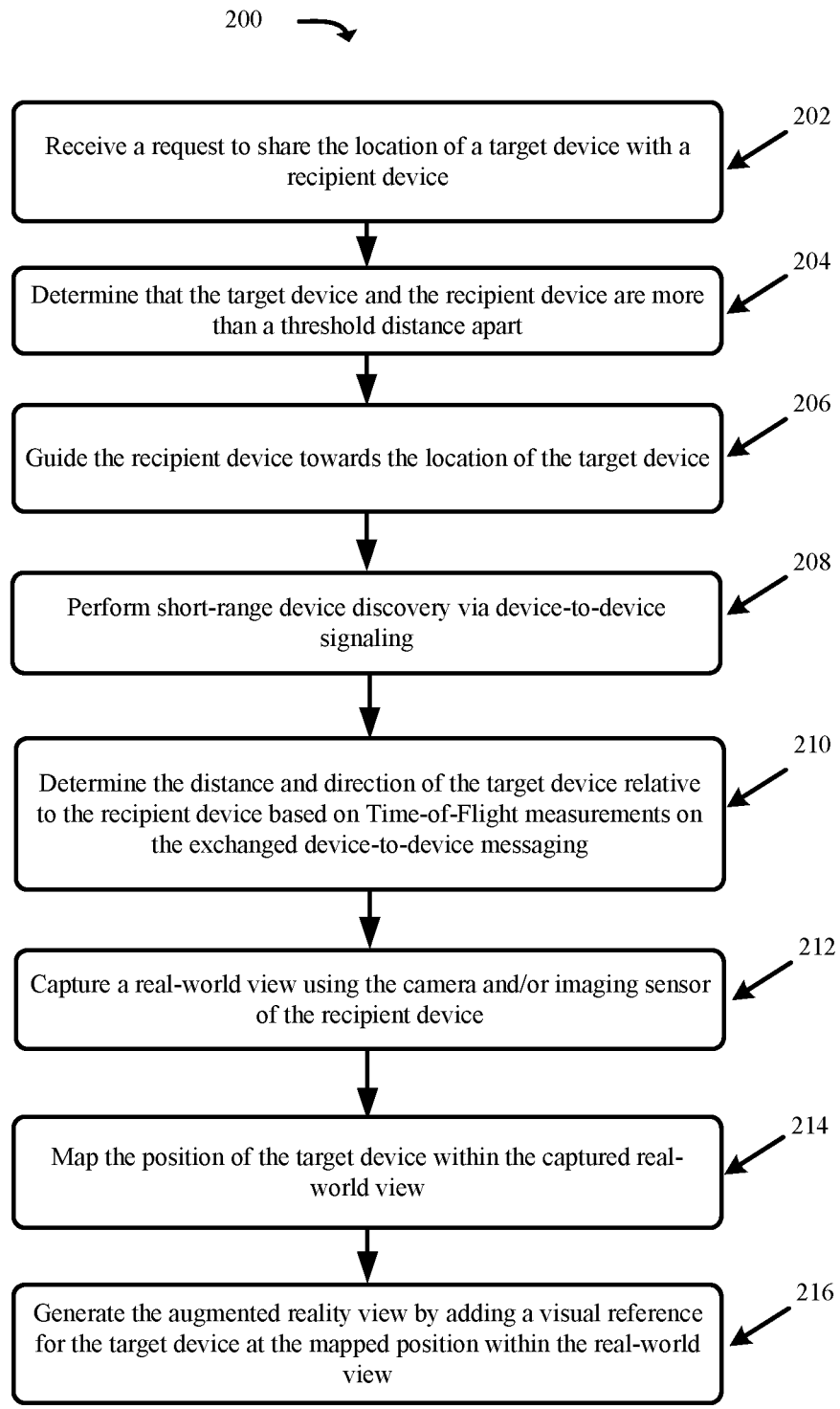
FIG. 2 presents a process for generating the augmented reality view based on the collaborative location tracking and sharing in accordance with some embodiments presented herein.

FIG. 2 presents a process 200 for generating the augmented reality view based on the collaborative location tracking and sharing in accordance with some embodiments presented herein. Process 200 is implemented based on the concerted operation of a location tracking system. The location tracking system includes target device 101, recipient device 103, and a coordination controller. In some embodiments, the coordination controller includes one or more cloud-based or remote devices that are accessed by target device 101 and recipient device 103 over a data network when performing the collaborative location tracking and sharing. In some other embodiments, the coordination controller is integrated as part of target device 101 and/or recipient device 103.

Process 200 includes receiving (at 202) a data packet or request to share the location of target device 101 with recipient device 103. The request may be generated in response to the user of target device 101 placing a pin on a digital map in order to share their location with recipient device 101, and/or target device 101 generating other messaging to facilitate the sharing of its location with recipient device 103. For instance, target device 101 may be configured to periodically provide updated location information to recipient device 103 for one or more coordinated tasks and/or other purposes.

The request data packet includes a unique identifier of target device 101. In some embodiments, the unique identifier corresponds to Universal Unique Identifier ("UUID"), Integrated Circuit Card Identifiers ("ICCID"), International Mobile Equipment Identity ("MEI"), Internet Protocol ("IP") address, Media Control Access ("MAC") address, device signature, and/or other unique value that is associated with target device 101. In some embodiments, target device 101 registers the unique identifier along with other identifier at the coordination controller. For instance, the coordination controller may associate the unique identifier of target device 101 with other identifiers used by target device 101 in discovery tokens and/or other UWB or Bluetooth signaling.

The request data packet further includes the location of target device 101. In some embodiments, the location of target device 101 is determined from GPS and/or other positional sensors of target device 101. In some other embodiments, the location of target device 101 is determined based on network triangulation techniques and/or network location tracking services. In some such embodiments, the coordination controller receives the request with the UUID of target device 101, and queries a location tracking network function or network location tracking services of the network operator using the UUID in order to obtain the location of target device 101. This location information is accurate to within several meters. The location information may be provided as a longitude and latitude or as other positional coordinates.

Process 200 includes determining (at 204) that target device 101 and recipient device 103 are more than a threshold distance apart. In some embodiments, the coordination controller obtains the location of recipient device 103, and compares the location of the two devices 101 and 103 to determine that they are more than the threshold distance apart from one another. In some other embodiments, the request with the location of target device 101 may be forwarded to recipient device 103, and recipient device 103 compares the location information in the request with its own location information to determine that the devices 101 and 103 are more than the threshold distance apart.

The threshold distance may be set to the signaling range of the device-to-device communication used by devices 101 and 103 to more accurately locate each other's position to within a few centimeters. Accordingly, the threshold distance may be set to be under 100 meters for UWB or Bluetooth signaling. When devices 101 and 103 are more than the threshold distance apart, device 101 and 103 may conserve power by disabling the device-to-device signaling over UWB or Bluetooth, or may conserve processing resources by ignoring device-to-device signaling until devices are within the threshold distance of one another.

Process 200 includes guiding (at 206) recipient device 103 towards the location of target device 101. For instance, recipient device 103 displays navigational directions for reaching target device 101 based on the geographical coordinates for the approximate location of target device 101. Alternatively, recipient device 103 generates an augmented reality view with a visual reference positioned at a distance in the direction of target device 101.

Process 200 includes performing (at 208) short-range device discovery via device-to-device signaling. The short-range device discovery occurs when devices 101 and 103 are within the threshold distance of one another and/or in direct messaging range of one another. The short-range device discovery may be implemented using one or more UWB or Bluetooth discovery standards or techniques. In some embodiments, coordination controller tracks the locations of target device 101 and recipient device 103, and activates the device-to-device communication (e.g., the UWB or Bluetooth radios) once the devices 101 and 103 are within the threshold range of one another.

Performing (at 208) the short-range device discovery includes using an out-of-band channel for devices 101 and 103 to discover each other. In some embodiments, target device 101 and recipient device 103 use the Bluetooth Low Energy ("BLE") discovery procedure to discover one another.

Recipient device 103 receives the signaling from target device 101 upon entering within range of the messaging, detects that the message includes the unique identifier of target device 101 or another identifier that is associated with the unique identifier, and continues with the short-range device discovery upon recognizing the identifier for the searched for target device 101. In some embodiments, the discovery messaging includes the UUID of target device 101. In some other embodiments, the discovery messaging includes a discovery token with a different identifier. In some such embodiments, coordination controller maps the identifier of the discovery token to the UUID of target device 101, and provides the mapping to recipient device 103 so that recipient device 103 is able to identify target device 101 from the discovery messaging, and is able to isolate the device-to-device signaling of the searched for target device 101 from other devices or beacons that may also transmit discovery messaging or that also perform the short-range device discovery procedure.

Performing (at 208) the short-range device discovery further includes performing service discovery, and, optionally, establishing a secure channel between devices 101 and 103. UWB capabilities of devices 101 and 103 are exchanged, and devices 101 and 103 agree on UWB parameters. Devices 101 and 103 may optionally negotiate the UWB role and session key exchange.

Process 200 includes determining (at 210) the distance and direction of target device 101 relative to recipient device 103 based on the ToF measurements calculated for the device-to-device messaging exchanged between recipient device 103 and target device 101. In some embodiments, target device 101 and/or recipient device 103 perform UWB ranging in order to accurately determine (at 210) the distance and direction of the other device to within a few centimeters. For instance, recipient device 103 performs the UWB ranging procedure by transmitting short pulses (e.g., a 500 Megahertz pulse of data that is encoded using binary phase-shift keying ("BPSK") and/or burst position modulation ("BPM") every two nanoseconds), and by computing the Time Difference of Arrival ("TDoA"), Two-Way Ranging ("TWR"), Angle of Arrival ("AoA"), and/or other ToF measurements on the transmitted pulses. From the ToF measurements, recipient device 103 accurately determines the distance and direction of target device 101 from recipient device 103. In some embodiments, recipient device 103 may use signal strength measures to determine the distance and direction of target device 101 relative to recipient device 103.

Process 200 includes capturing (at 212) a real-world view using the camera and/or imaging sensor of recipient device 103. Capturing (at 212) the real-world view includes recording video or continually capturing of the real-world falling in the camera's field-of-view. In some embodiments, recipient device 103 activates the camera upon discovering target device 101 via the short-range discovery procedure.

Process 200 includes mapping (at 214) the position of target device 101 within the captured (at 212) real-world view. Recipient device 103 tracks the orientation and/or position of the camera capturing (at 212) the real-world view using positional and/or orientation sensors of recipient device 103, and determines where target device 101 is within the captured (at 212) real-world view based on the determined (at 210) distance and direction of target device 101 relative to the tracked orientation and/or position of the camera or recipient device 103. In other words, recipient device 103 maps (at 214) the determined (at 210) distance and direction of target device 101 to a corresponding point or position within the captured (at 212) real-world view.

Process 200 includes generating (at 216) the augmented reality view by adding a visual reference for target device 101 at the mapped (at 214) position within the real-world view. The visual reference includes a graphical indicator that is overlaid or add into the captured (at 212) real-world view to indicate the position of target device 101.

In some embodiments, recipient device 103 performs one or more image recognition techniques to identify target device 101 in the captured (at 212) real-world view and/or images presented as part of the augmented reality view, and to fix the position of the visual reference to the identified form of target device 101 in the real-world view and/or images. In some such embodiments, recipient device 103 executes the image recognition techniques to identify the device (e.g., shape, form, and size) in the real-world view that is closest to the detected position of target device 101, and to align the presentation of the visual reference with the tracked position of the identified device.

Figure 3:
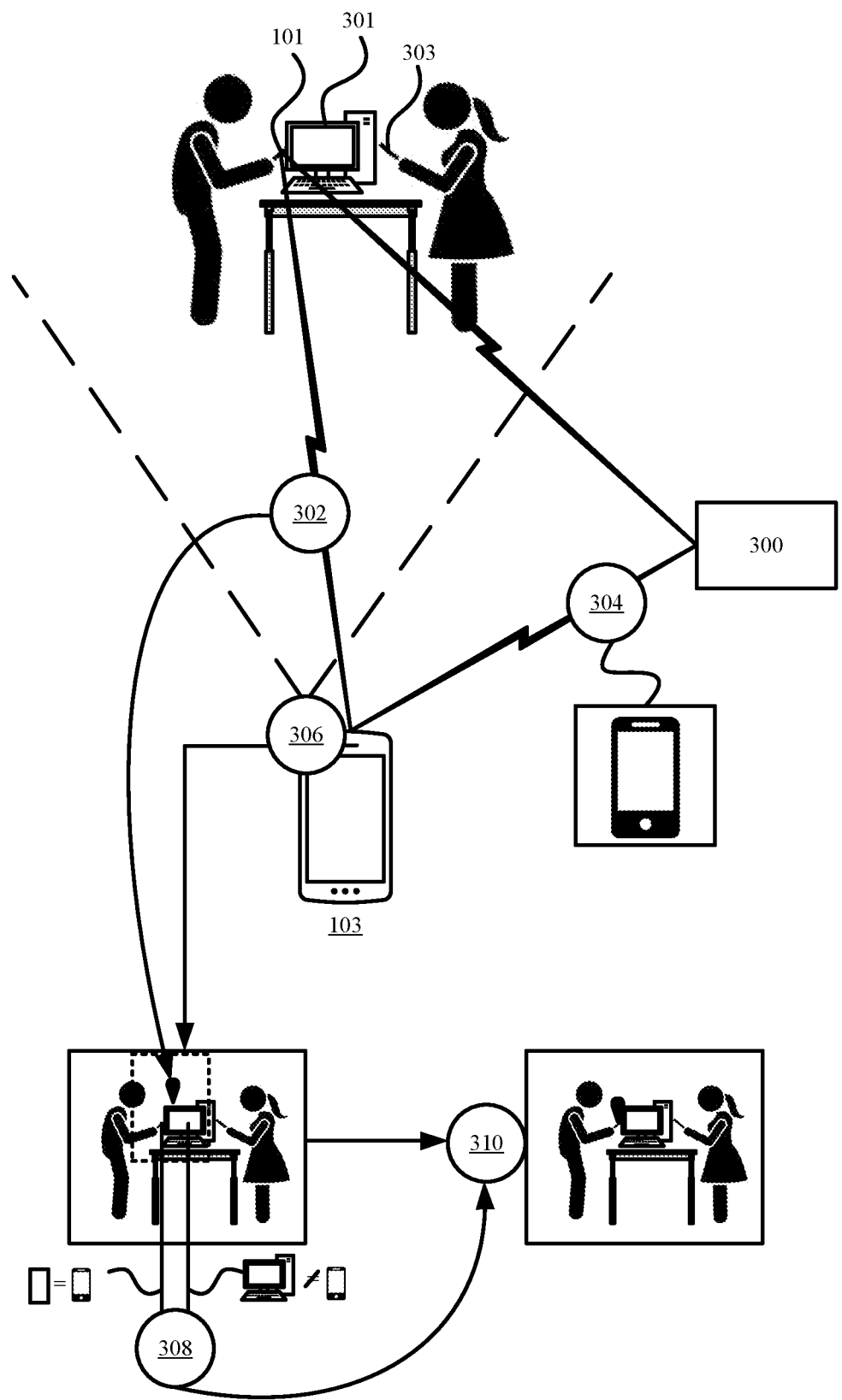
FIG. 3 illustrates an example of using image recognition to improve the augmented reality view created from the collaborative location tracking and sharing in accordance with some embodiments presented herein.

FIG. 3 illustrates an example of using image recognition to improve the augmented reality view created from the collaborative location tracking and sharing in accordance with some embodiments presented herein. As shown in FIG. 3, recipient device 103 uses ToF, signal strength, and/or other measures to determine (at 302) the position (e.g., distance and direction or longitude) of target device 101 relative to recipient device 103. However, several nearby objects 301 and 303 are at or around the determined position of target device 101.

Recipient device 103 determines (at 304) a form, shape, and/or size of target device 101 based on the unique identifier of target device 101. For instance, recipient device 103 or coordination controller 300 may perform a lookup of the unique identifier (e.g., UUID of target device 101) to determine (at 304) the form, shape, and/or size of target device 101. In some embodiments, the unique identifier may be associated with a make and model of target device 101, and the form, shape, and/or size of target device 101 may be identified based on the mark and model. In some other embodiments, target device 101 registers its make and model or form, shape, and/or size with coordination controller 300 when registering for the collaborative location tracking and sharing functionality, and coordination controller 300 may provide the make and model or form, shape, and/or size information to recipient device 103 upon a recipient device 103 receiving the location of target device 101.

Recipient device 103 captures (at 306) the real-world view that includes target device 101. Recipient device 103 analyzes (at 308) the captured images for an object having a similar form, shape, and/or size at or around the determined position of target device 101 in the captured images.

In response to detecting an object having the form, shape, and/or size determined (at 304) for target device 101, recipient device 103 updates (at 310) the augmented reality view by repositioning the visual reference from the determined (at 302) position of target device 101 (which may or may not align with any objects in the image or may align with two or more objects in the image) to the object in the image having the form, shape, and/or size determined (at 304) for target device 101 at or near the determined (at 302) position of target device 101.

In some embodiments, target device 101 may be hidden from view. For instance, target device 101 may be in a pocket, purse, or bag such that it is not visible in the captured images. In some such embodiments, the image recognition techniques may detect a human form that is closest to the position of target device 101, and recipient device 103 may reposition the visual reference that identifies the position of target device 101 in the augmented reality view over the detected human form.

In some embodiments, target device 101 may be positioned behind another object. For instance, target device 101 may be behind a door or a desk. The image recognition techniques may determine the obstruction by virtue of no object matching the form, shape, and/or size of target device 101 and no human form being around the determined position of target device 101. In some such embodiments, target device 101 adjusts the visual reference so that it is partially obstructed by the object in the foreground as an indication that target device 101 is located behind the object in the foreground.

Figure 4:
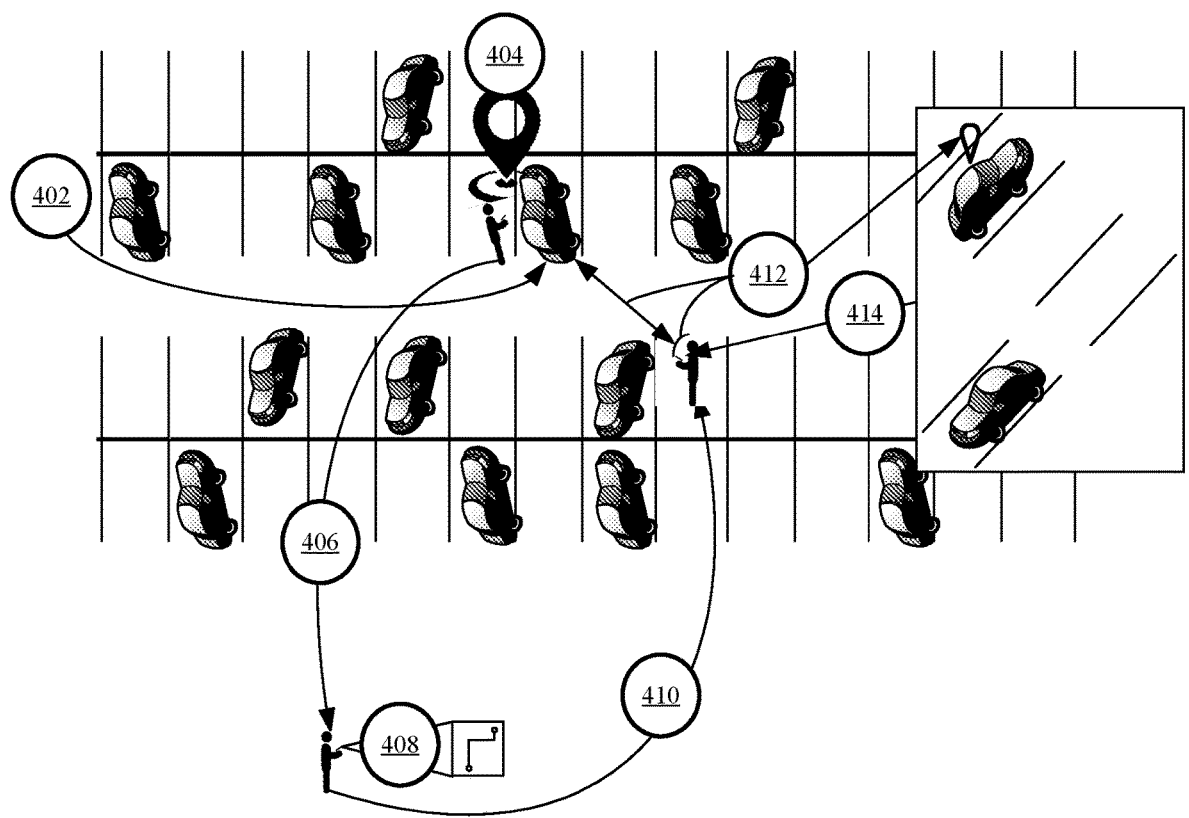
FIG. 4 illustrates an example of using the augmented reality view generated from the collaborative location tracking and sharing to locate a desired object in accordance with some embodiments presented herein.

The augmented reality view generated from the collaborative location tracking and sharing may also be used to locate objects such as vehicles in a parking lot, a set of keys, and/or other physical goods. FIG. 4 illustrates an example of using the augmented reality view generated from the collaborative location tracking and sharing to locate a desired object in accordance with some embodiments presented herein.

As shown in FIG. 4, a user parks (at 402) their vehicle in a large parking lot. The vehicle is UWB-enabled. In other words, the vehicle includes a UWB radio for location tracking and/or other purposes such as remote unlocking or remote starting of the vehicle.

Once parked, the user accesses their mobile device to pin (at 404) the vehicle's location. For instance, the user opens a mapping application and issues a request to track the vehicle's location. The vehicle's location may be determined using GPS or network location services, and may correspond to the location of the user device when pinning (at 404) the vehicle's location. In other words, the pinned vehicle location may not even be the GPS location of the vehicle, but the GPS location of the user device when pinning (at 404) the vehicle's location.

The user device moves (at 406) out of UWB signaling range of the vehicle before seeking assistance in locating their vehicle in the parking lot. When out of the UWB signaling range of the vehicle, the user device determines its current location using GPS or network location services, and provides (at 408) navigational guidance to the stored vehicle location. In some embodiments, the navigational guidance is provided via an augmented reality view that presents a visual reference in the direction of the vehicle location over a real-world view of the scene before the user device. In any case, the navigational guidance identifies the vehicle location to within several meters of accuracy, and does not exactly pinpoint the vehicle location. In other words, the navigational guidance may be offset from the actual vehicle location such that it directs the user to the wrong vehicle albeit in proximity of the user's vehicle.

Once the user device is moved (at 410) in UWB signaling range of the vehicle, UWB ranging via device-to-device signaling is used to determine the exact location of the vehicle. Specifically, the user device performs (at 412) ToF measurements based a time, angle, and/or other differences at which request signaling is sent to the UWB radio of the vehicle and response signaling is returned from the UWB radio of the vehicle to the UWB radio of the user device. The user device derives the distance and direction of the vehicle relative to the user device based on the ToF measurements, and generates (at 414) an augmented reality view with a visual reference over the exact location of the vehicle in real-world view of the scene within the user device camera's field-of-view. The positioning of the visual reference and/or the exact location of the vehicle identified in the augmented reality view is derived from the ToF measurements that were generated via the device-to-device communication and the exchanging of UWB signaling and not the vehicle location that was pinned (at 402) and stored.

In some embodiments, the collaborative location tracking and sharing is used to coordinate the movements of multiple devices for the completion of a coordinated task without continual back-and-forth communication between the device users. In some embodiments, state information is conveyed as part of the collaborative location tracking and sharing. The state information provides additional indicators as to whether or not tasks at the coordinated locations have been completed or are pending, have been successful or unsuccessful, and/or have reached various states.

Using the state information and the collaborative location tracking and sharing, members of a team, individuals needing assistance, and/or resources for aid or assistance may be better coordinated without having to individually contact each team member, individual needing assistance, or those tasked with distributing the resources. Instead, all participants receive a coordinated task, and individually coordinate their positioning and state according to the coordinated task and the positioning and state of others. The collaborative location tracking and sharing therefore has numerous applications for first responders, emergency service providers, and group leaders (e.g., teachers, team managers, etc.).

Figure 5:
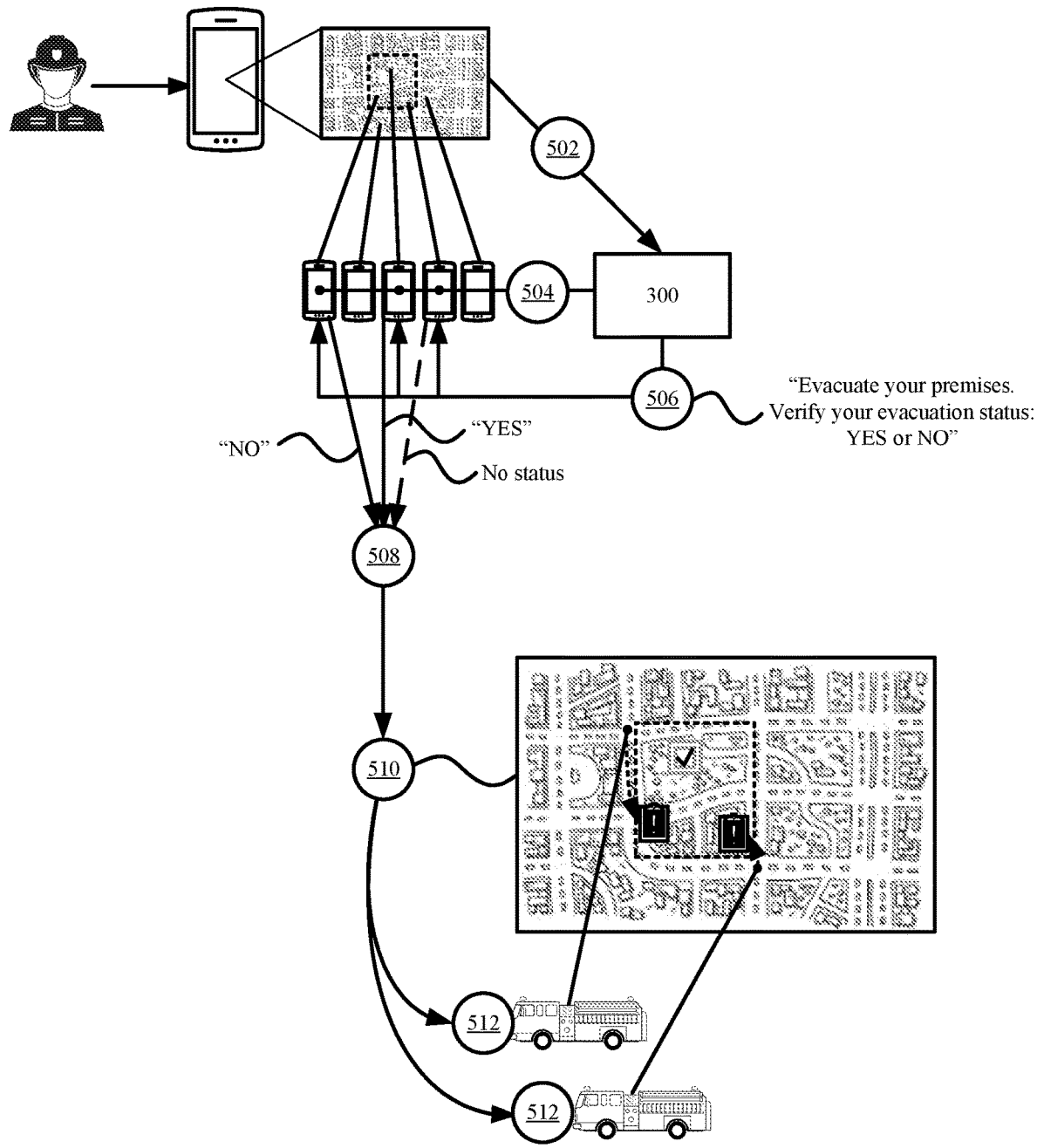
FIG. 5 illustrates an example of coordinating resources using the collaborative location tracking and sharing in accordance with some embodiments presented herein.

FIG. 5 illustrates an example of coordinating resources using the collaborative location tracking and sharing in accordance with some embodiments presented herein. In FIG. 5, an emergency order or evacuation order is issued (at 502) for residents or individuals in a given region to evacuate. For instance, the emergency order may be issued (at 502) in response to forecasted landfall by a hurricane or a wildfire that is moving towards the given region.

A leader tasked with coordinating the evacuation (e.g., a fire captain, a police captain, a city official, etc.) draws a perimeter around the given region on a map, and issues (at 502) the evacuation order for the region within the perimeter from their device. The perimeter and evacuation order are sent to coordination controller 300.

Coordination controller 300 authorizes the evacuation order. For instance, coordination controller 300 determines that the evacuation order is issued by a user or from a device with permissions and/or rights to issue the evacuation order.

Coordination controller 300 selects (at 504) a set of user devices that are associated with positions or addresses inside the perimeter. In some embodiments, coordination controller 300 accesses an emergency services database that stores the telephone numbers, email addresses, or other contact information for residents in the perimeter, and selects (at 504) the set of user devices based on the contact information in the emergency services database. In some other embodiments, coordination controller 300 tracks the positioning of the set of user devices to determine that the associated users reside or frequently access locations within the perimeter, and selects (at 504) the set of user devices based on the tracking.

In still some other embodiments, the set of user devices register their home location with coordination controller 300, a telecommunications provider, or other service provider, and coordination controller 300 selects (at 504) the set of user devices based on their registered home location.

Coordination controller 300 distributes (at 506) an alert message to each of the selected (at 504) set of user devices. In some embodiments, coordination controller 300 sends the alert message via a telecommunications network or other wireless data network. The alert message may be a text message, email, real-time communication message, telephone recording, or other form of real-time or direct messaging that appears on the selected (at 504) set of user devices. The alert message includes a link or inputs for the associated users to provide status as pertaining to the alert message. For instance, the status operation for the evacuation order may include "Evacuated (YES)" and "Have not evacuated (NO)".

Coordination controller 300 collects (at 508) the status responses from the selected (at 504) set of user devices and/or the addressing inside the evacuation perimeter associated with each user device. For instance, each user device may provide a status update when they have evacuated the perimeter, or may provide the status update with an address that they confirm has been evacuated. Alternatively, coordination controller 300 may track the location of the user device that were alerted in the perimeter. Once coordination controller 300 detects that a user device has exited the perimeter, coordination controller 300 may automatically update the status for that user device or the address associated with that user device.

Coordination controller 300 generates (at 510) a unified presentation of the user device statuses for the emergency service providers. Generating (at 510) the unified presentation includes updating the map of evacuation zone with visual references that identify the status of whether or not a user has confirmed that a building associated with that user's device has been evacuated. In some embodiments, generating (at 510) the unified presentation includes generating an augmented reality view with the visual references that identify if any of the set of user devices are located within a building that is in the evacuation zone, and/or that identify the status of whether or not a user device associated with an address inside the evacuation zone has provided status confirmation that the associated address has been evacuated.

Coordination controller 300 sends (at 512) the unified presentation to emergency service providers associated with the leader coordinating the evacuation. The emergency service providers use the unified presentation (e.g., updated map and/or augmented reality view) to coordinate their efforts on buildings or addresses where users remain and/or that have not been confirmed as having been evacuated. In other words, rather than go door-to-door and inspect each building in the limited time that they have, the emergency service providers may prioritize those buildings where a user remains or where the evacuation of the building cannot be confirmed.

Accordingly, the location tracking system routes the emergency service providers to the buildings or addresses where users remain and/or that have not been confirmed as having been evacuated according to the unified presentation. In some embodiments, the emergency service providers may drive down the street and use the augmented reality view created by coordination controller 300 to determine which locations to stop and inspect and which to skip over as a result of having received a status confirmation from user devices associated with the locations where the evacuation status has been confirmed. Once at a location that has not been evacuated, the emergency services provides may enter the location with the augmented reality view of their devices enabled. Their device use the UWB ranging to detect the devices of individuals that have not evacuated the location, and to create the augmented reality view with visual references that exactly identify the location of the individuals that may be trapped, stuck, and/or otherwise require assistance from the emergency services personnel to evacuate.

Moreover, coordination controller 300 may track the location of the emergency services personnel, and may automatically update the status of locations or buildings where the emergency services personnel are providing assistance. Accordingly, the team leader is provided a real-time view of locations that have not been evacuated, locations where emergency services personnel are assisting in the evacuation, and locations that have been evacuated without the team leader having continuous back-and-forth communication with the emergency services personnel. In other words, the emergency services personnel can do their jobs and assist people at the various locations, and coordination controller 300 will automatically update the status at those locations for the team leader without the emergency services personnel having to actively reach out and communicate with the team leader.

The request for assistance may be initiated by a user. For instance, the user may call or message the emergency services dispatch to request assistance at an address. The dispatch may pin the address on the map with a status message that assistance is requested at that pinned location. In some embodiments, the user speaks or messages the address. In some other embodiments, the dispatch automatically obtains the address based on location information provided by the user device when contacting the dispatch. The map with the pinned address may be sent to emergency services personnel user devices in the area.

Coordination controller 300 may track the movements of the emergency services personnel, and may update the status on all emergency services personnel devices when a particular unit arrives at the address. The device of the particular unit may switch to UWB ranging in order to communicate directly with the user device and pinpoint the location of the user device at the address. The device of the particular unit may then generate an augmented reality view that assists in locating the user at the address.

In some embodiments, members of a team may self-coordinate based on the status information that they receive from other team members. In other words, team members may independently coordinate amongst themselves to perform collaborative tasks based on the collaborative location tracking and sharing, rather than have to wait and take instruction from a team leader. This results in faster task execution and faster emergency service responsiveness.

Figure 6:
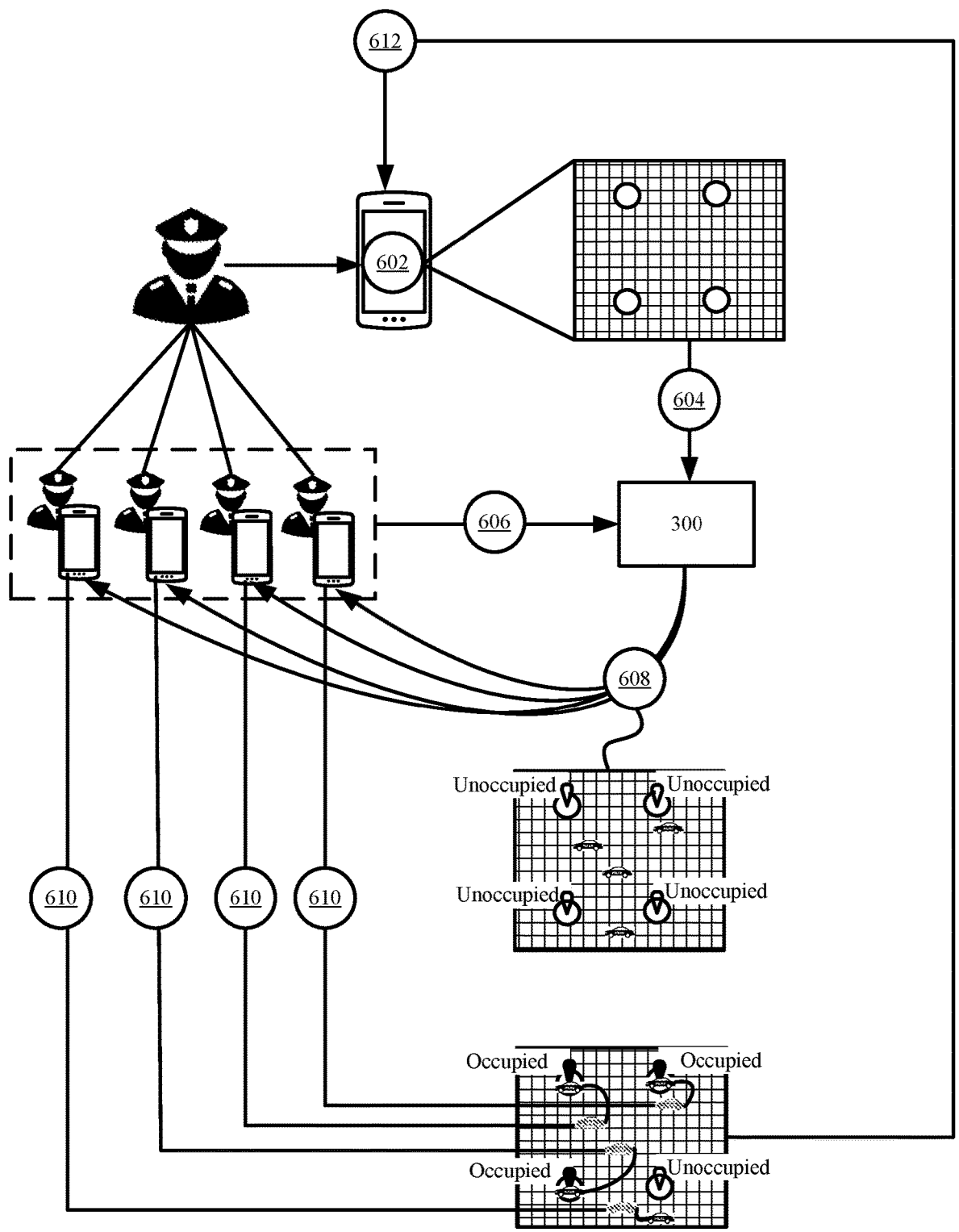
FIG. 6 illustrates an example of team members self-coordinating based on the collaborative location tracking and sharing in accordance with some embodiments presented herein.

FIG. 6 illustrates an example of team members self-coordinating based on the collaborative location tracking and sharing in accordance with some embodiments presented herein. A team leader defines (at 602) a collaborative task that requires different team members to perform in concert. For instance, an emergency services leader sets up a perimeter around a region to prevent specified persons from leaving the region or to prevent specified persons from entering the region. The collaborative task requires different emergency service members to be stationed at different defined (at 602) points about the perimeter to enforce the perimeter. However, rather than having the team leader individually contact each team member to notify them of their position and then check back with them to verify that they have moved to the assigned position, the team leader marks the perimeter on a map by designating positions about the perimeter where team members are to be stationed, and uploads (at 604) the defined (at 602) collaborative task with the designated positions from their device to coordination controller 300.

Coordination controller 300 identifies (at 606) the team members associated with the team leader, and identifiers for contacting the mobile devices of the team members. In some embodiments, teams register with coordination controller 300 by providing the identifiers of the team leader device from which coordinated or collaborative tasks may be assigned, and the identifiers of the team member devices that are to execute the coordinated or collaborative tasks. Accordingly, coordination controller 300 includes a database that is configured with the devices of members belonging to a particular group, and the one or more members of the particular group with privileges to defined and/or assign coordinated tasks to the other members of the particular group, and to leverage the collaborative location tracking and sharing services of the location tracking system and/or coordination controller 300 for the execution of the coordinated tasks.

Coordination controller 300 distributes (at 608) the defined (at 602) collaborative task to the devices of the identified (at 606) team members. Distributing (at 608) the defined (at 602) collaborative task involves sending the map with the assigned stations or locations where team members are needed to each team member's device. The assigned stations or locations are identified with visual markers that further identify each assigned station's status. In this example, the status indicates if a team member has occupied or will occupy the station.

Team members self-coordinate by independently selecting (at 610) and moving or routing to an unoccupied station. For instance, a team member selects (at 610) a closest station that is unoccupied, and updates the status for that station to indicate that they will or have occupied that station. The team member's device provides an augmented reality view of where the team member is to be stationed, and once coordination controller 300 tracks the device's location to the assigned station, coordination controller 300 automatically updates the visual marker and/or status of that station for all devices.

Coordination controller 300 provides (at 612) the updated presentation with the visual reference for the position of each team member device and/or the status at each station of the defined (at 602) collaborative task to the device of team leader. The team leader is able to see in real-time which team members are headed to which stations, and which stations have been occupied by which team members without having to individually assign the stations to specific team members followed by repeated back-and-forth communication for monitoring progress of the collaborative task. In other words, the team leader may spend less time communicating with their team, and more time on executing collaborative task.

In some embodiments, coordination controller 300 may be directly engaged in the performance of a coordinated or collaborative task. For instance, coordination controller 300 may automatically provide status updates based on the collaborative location tracking and sharing.

Figure 7:
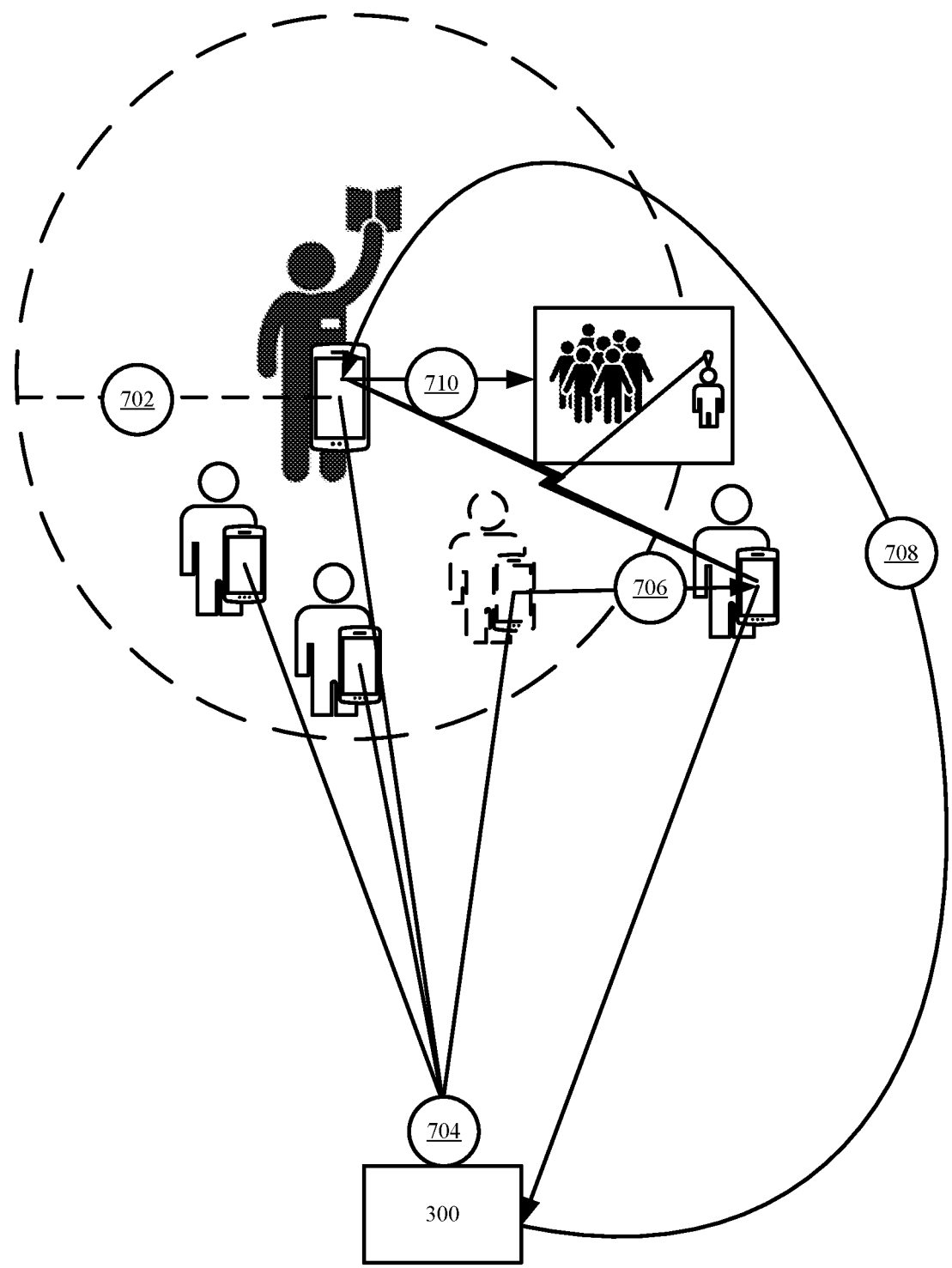
FIG. 7 illustrates an example of providing automatic updated status for the coordination of a task based on the collaborative location tracking and sharing in accordance with some embodiments presented herein.

FIG. 7 illustrates an example of providing automatic updated status for the coordination of a task based on the collaborative location tracking and sharing in accordance with some embodiments presented herein. A group leader uses their device to establish (at 702) a perimeter in which group members are to remain.

Coordination controller 300 tracks (at 704) the location of the group members within the perimeter based on the location information shared by the group member devices. For instance, the group leader may be a teacher or tour guide, the group members may include students that the teacher is responsible for or tourists that follow the tour guide, and the perimeter may be a designated location or area that the group members are to remain within. In some embodiments, the perimeter is set over a fixed location. For instance, the teacher may set the perimeter over a specific classroom. In some embodiments, the perimeter is set to move in conjunction with the tracking location of the team leader's device. For instance, the tour guide may set a perimeter for tourists to remain within 20 feet of the tour guide.

In response to detecting (at 706) a particular device leaving the perimeter, coordination controller 300 sends (at 708) a notification to the group leader's device. The notification identifies the group member that has exited the perimeter. In some embodiments, the group leader's device generates (at 710) an augmented reality view for tracking the particular device in response to the notification. Specifically, coordination controller 300 provides the positioning of the particular device if the particular device is beyond the device-to-device signaling range of the particular device and the group leader's device. As the group leader device and the particular device get closer to one another, the devices switch to device-to-device communications and use the directionality features of UWB, Bluetooth, or another radio technology for precise location tracking and location identification. For instance, the group leader's device exchanges device-to-device signaling with other nearby devices until the unique identifier of the particular device is discovered, then the group leader's device performs the UWB ranging procedure to locate the distance and direction of the particular device relative to the group leader's device. The group leader's device uses the distance and direction information to create an augmented reality view with a visual reference for the position of the particular device in a real-world view captured by the group leader's device.

In some embodiments, the collaborative location tracking and sharing with augmented reality is used to enhance social media and/or user engagement. For instance, the collaborative location tracking and sharing is used to generate location hotspots, and guide tourists to points-of-interest based on social engagement with those points-of-interests.

Figure 8:
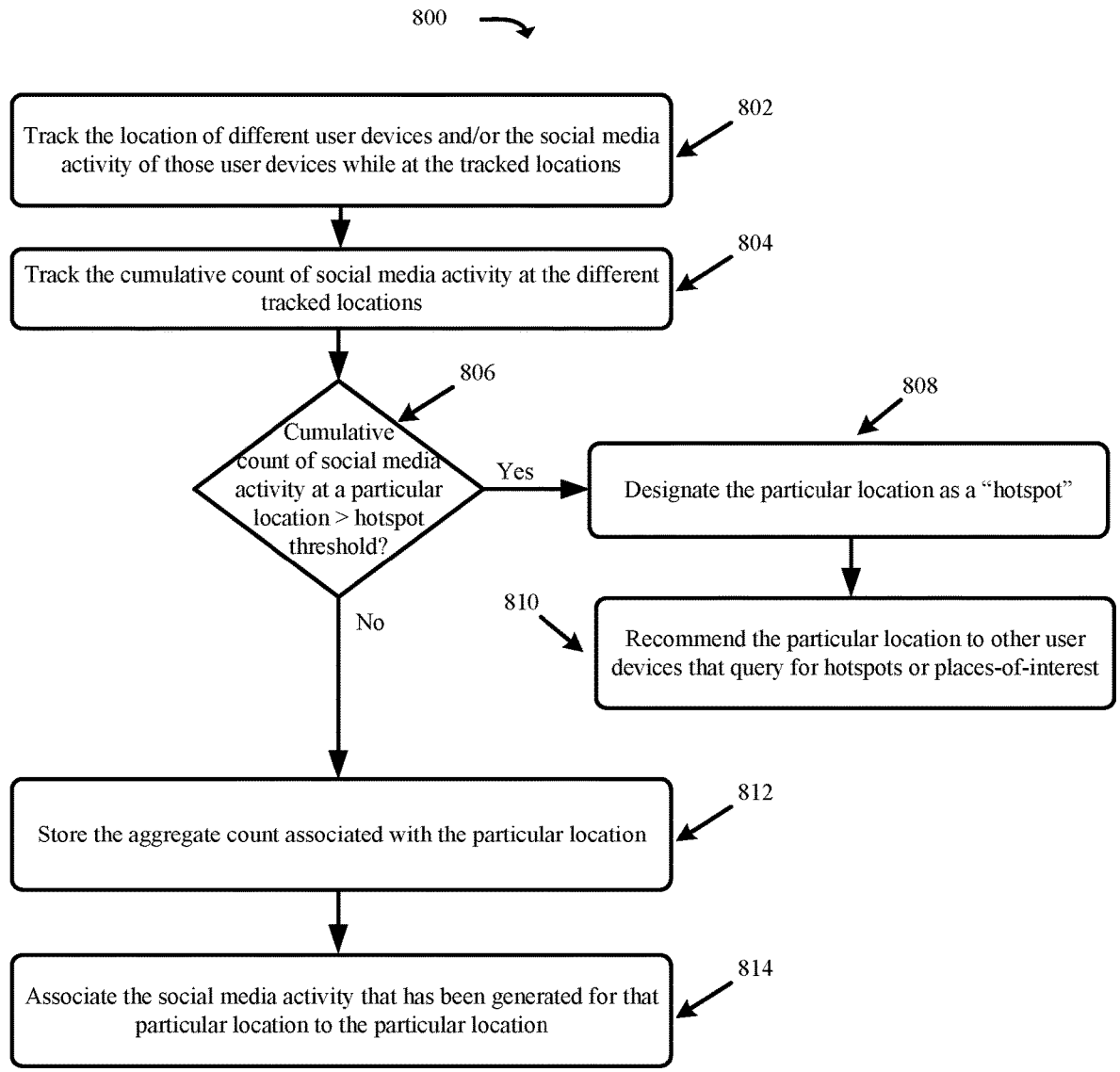
FIG. 8 presents a process for generating location hotspots based on the collaborative location tracking and sharing in accordance with some embodiments presented herein.

FIG. 8 presents a process 800 for generating location hotspots based on the collaborative location tracking and sharing in accordance with some embodiments presented herein. Process 800 is implemented by coordination controller 300.

Process 800 includes tracking (at 802) the location of different user devices and/or the social media activity of those user devices while at the tracked locations. The social media activity may include images that are taken and/or shared by the user devices while at specific locations, posts created while at specific locations, and/or other shared communications from the specific locations.

Process 800 includes tracking (at 804) the cumulative count of social media activity at the different tracked (at 802) locations, and determining (at 806) if the cumulative count of social media activity at a particular location exceeds a hotspot threshold. The hotspot threshold may be a predefined value, or may be dynamically configured based on overall social media activity or social media activity that occurs over a particular period of time.

In response to determining (at 806—Yes) that the cumulative count of social media activity at a particular location exceeds the hotspot threshold, process 800 includes designating (at 808) the particular location as a "hotspot", and recommending (at 810) the particular location to other user devices that query for hotspots or places-of-interest. Recommending (at 810) the particular location includes generating the augmented reality view that presents the real-world view of the hotspot location overlaid with images, posts, and/or other user activity that was generated by other users while at the hotspot location. The overlaid images, posts, and activity provide the visitor with images of the points-of-interest at the hotspot location as well as textual references to the best hotspot features.

Coordination controller 300 may change the visual reference or status associated with each hotspot based on the cumulative user activity that is tracked at each hotspot location. For instance, a first hotspot location that is associated with 1,000 user posts and images may be identified with a first color or visual indicator, and a second hotspot location that is associated with 500 user posts and images may be identified with a second color or visual indicator.

In response to determining (at 806—No) that the cumulative count of social media activity at the particular location does not exceed the hotspot threshold, process 800 includes storing (at 812) the aggregate count associated with the particular location. Process 800 also includes associating (at 814) social media activity that has been generated for that particular location to the particular location.

Figure 9:
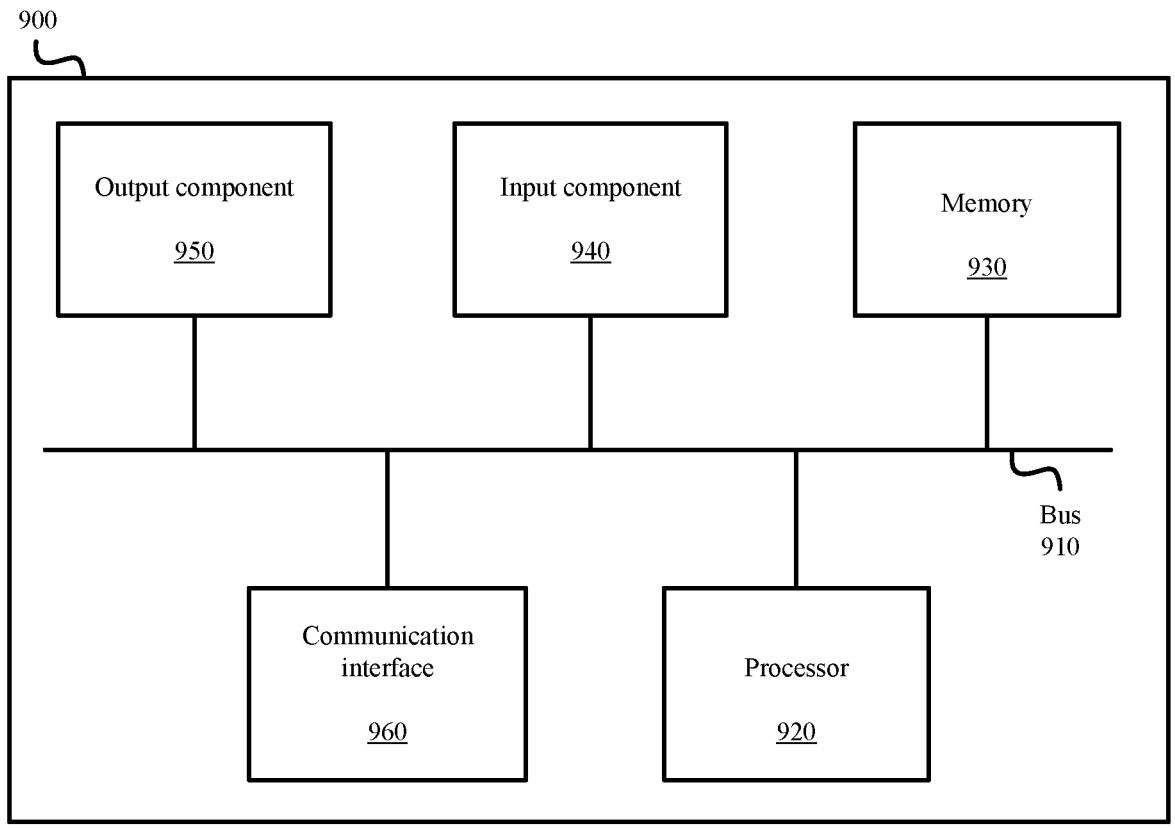
FIG. 9 illustrates example components of one or more devices, according to one or more embodiments described herein.

FIG. 9 is a diagram of example components of device 900. Device 900 may be used to implement one or more of the devices or systems described above (e.g., coordination controller 300, the location tracking system, target device 101, recipient device 103, other user devices, etc.). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more LEDs, etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
    receiving a pinned location that is associated with a desired destination on a user device;
    determining a distance between a location of the user device and the pinned location;
    capturing images of a scene before the user device using a camera of the user device; and
    generating an augmented reality view comprising a visual reference positioned in the images of the scene in a direction of the pinned location in response to the user device being at least a threshold distance from the pinned location, and the visual reference at a particular position in the images of the scene that corresponds to the pinned location in response to the user device moving within the threshold distance of the pinned location.

2. The method of claim 1 further comprising:
    selecting the desired destination from a plurality of destinations that are presented on the user device.

3. The method of claim 1 further comprising:
    setting the pinned location on a mapping application.

4. The method of claim 1, wherein generating the augmented reality view comprises:
    determining that the desired destination is not within the images of the scene based on a first distance between the location of the user device and the pinned location;

positioning the visual reference in the images of the scene in the direction of the pinned location in response to determining that the desired destination is not within the images of the scene;

determining that desired destination is within the images of the scene based on a second distance between the location of the user device and the pinned location; and positioning the visual reference in the images of the scene at the particular position in response to determining that the desired destination is within the images of the scene.

5. The method of claim 1, wherein receiving the pinned location comprises:

receiving a request for assistance from a target device, wherein the request comprises the pinned location and an identifier of the target device.

6. The method of claim 5, wherein generating the augmented reality view comprises:

determining that the user device is within the threshold distance of the pinned location in response to detecting a short-range transmission with the identifier from the target device.

7. The method of claim 1, wherein determining the distance comprises:

tracking a location of the user device using one or more radios of the user device; and comparing the location of the user device to the pinned location.

8. The method of claim 7, wherein determining the distance further comprises:

detecting short-range signaling from a radio associated with the desired destination;

measuring a distance and direction of the desired destination relative to the user device using the short-range signaling.

9. The method of claim 1 further comprising:

receiving a first status indicator with the pinned location of the desired destination from a second device;

changing the first status indicator to a second status indicator in response to the user device arriving at the desired destination; and sending the second status indicator to the second device via wireless messaging.

10. The method of claim 1 further comprising:

tracking the location of the user device to the pinned location; and updating a status associated with the desired destination.

11. The method of claim 10, wherein updating the status comprises:

transmitting a status update from the user device to a second device at the pinned location.

12. The method of claim 10, wherein updating the status comprises:

changing a status associated with the pinned location on a map to indicate that the user device has reached the desired destination.

13. The method of claim 1 further comprising:

receiving an output from an orientation sensor of the user device; and wherein generating the augmented reality view comprises:

positioning the visual reference in the images of the scene based on the pinned location relative to the location of the user device and an orientation of the user device that is determined from the output of the orientation sensor.

14. The method of claim 1, wherein generating the augmented reality view comprises:

exchanging short-range signaling directly between a radio of the user device and a radio of a device associated with the desired destination; and positioning the visual reference at the particular position in the images of the scene based on distance and directional measurements obtained from the short-range signaling.

15. The method of claim 1, wherein generating the augmented reality view comprises:

transitioning the visual reference from indicating the direction of the pinned location to the particular position in response to detecting short-range signaling from a radio associated with a device at the desired destination.

16. The method of claim 1 further comprising:

detecting a plurality of target devices upon the user device arriving at the desired destination; and wherein generating the augmented reality view comprises:

presenting the visual reference over each target device from the plurality of target devices in the images of the scene with the user device at the desired destination.

17. The method of claim 16, wherein detecting the plurality of target devices comprises:

detecting a precise location of each target device from the plurality of target devices based on Ultra-WideBand ("UWB") signaling exchanged between the user device and each target device of the plurality of target devices.

18. A device comprising:

one or more radios for wireless communication;

a camera; and one or more hardware processors configured to:

receive a pinned location that is associated with a desired destination using the one or more radios;

determine a distance between a location of the device and the pinned location;

capture images of a scene before the device using the camera; and generate an augmented reality view comprising a visual reference positioned in the images of the scene in a direction of the pinned location in response to the device being at least a threshold distance from the pinned location, and the visual reference at a particular position in the images of the scene that corresponds to the pinned location in response to the device moving within the threshold distance of the pinned location.

19. The device of claim 18, wherein generating the augmented reality view comprises:

determining that the desired destination is not within the images of the scene based on a first distance between the location of the device and the pinned location;

positioning the visual reference in the images of the scene in the direction of the pinned location in response to determining that the desired destination is not within the images of the scene;

determining that desired destination is within the images of the scene based on a second distance between the location of the device and the pinned location; and positioning the visual reference in the images of the scene at the particular position in response to determining that the desired destination is within the images of the scene.

20. A non-transitory computer-readable medium storing program instructions that, when executed by one or more hardware processors of a user device, cause the user device to perform operations comprising:
- receiving a pinned location that is associated with a desired destination on a user device;
- determining a distance between a location of the user device and the pinned location;
- capturing images of a scene before the user device using a camera of the user device; and
- generating an augmented reality view comprising a visual reference positioned in the images of the scene in a direction of the pinned location in response to the user device being at least a threshold distance from the pinned location, and the visual reference at a particular position in the images of the scene that corresponds to the pinned location in response to the user device moving within the threshold distance of the pinned location.

* * * * *